United States Patent
Gormley

(10) Patent No.: US 12,241,433 B2
(45) Date of Patent: Mar. 4, 2025

(54) THRUST REVERSER SYSTEM WITH ANGLED DOOR PIVOT AXES

(71) Applicant: Rohr, Inc., Chula Vista, CA (US)

(72) Inventor: Timothy Gormley, Bonita, CA (US)

(73) Assignee: ROHR, INC., Chula Vista, CA (US)

( * ) Notice: Subject to any disclaimer, the term of this patent is extended or adjusted under 35 U.S.C. 154(b) by 0 days.

(21) Appl. No.: 17/962,147

(22) Filed: Oct. 7, 2022

(65) Prior Publication Data

US 2024/0117781 A1    Apr. 11, 2024

(51) Int. Cl.
*F02K 1/60* (2006.01)
*F02K 1/76* (2006.01)

(52) U.S. Cl.
CPC .............. *F02K 1/60* (2013.01); *F02K 1/763* (2013.01)

(58) Field of Classification Search
CPC ... F02K 1/60; F02K 1/605; F02K 1/62; F02K 1/625; F02K 1/763
See application file for complete search history.

(56) References Cited

U.S. PATENT DOCUMENTS

| | | | | |
|---|---|---|---|---|
| 4,194,692 A * | 3/1980 | Dickenson | ................ | F02K 1/60 239/265.33 |
| 4,410,152 A | 10/1983 | Kennedy | | |
| 5,230,213 A * | 7/1993 | Lawson | ................... | F02K 1/60 244/110 B |
| 8,434,715 B2 | 5/2013 | Lair | | |
| 11,286,879 B2 | 3/2022 | Gormley | | |
| 11,396,854 B2 | 7/2022 | Gormley | | |
| 2015/0291289 A1* | 10/2015 | Chandler | ................. | B64C 5/02 244/110 B |
| 2016/0053718 A1* | 2/2016 | Cerra | ....................... | F02K 1/72 60/226.3 |
| 2016/0160798 A1* | 6/2016 | Guerin | ...................... | F02K 3/06 239/265.19 |
| 2019/0162135 A1* | 5/2019 | Channell | ................... | F02K 1/60 |
| 2019/0301399 A1* | 10/2019 | Lacko | ....................... | F02K 1/60 |
| 2020/0003152 A1 | 1/2020 | Gormley | | |
| 2020/0003156 A1* | 1/2020 | Gormley | ................... | F02K 1/60 |

OTHER PUBLICATIONS

EP Search Report for EP Patent Application No. 23202421.6 dated Feb. 26, 2024.

* cited by examiner

*Primary Examiner* — Andrew H Nguyen
(74) *Attorney, Agent, or Firm* — Getz Balich LLC

(57) ABSTRACT

An apparatus is provided for an aircraft propulsion system. This apparatus includes a pivoting door thrust reverser system, and the pivoting door thrust reverser system includes a plurality of thrust reverser doors. Each of the thrust reverser doors is configured to pivot about a respective pivot axis between a stowed position and a deployed position. The thrust reverser doors include a first thrust reverser door and a second thrust reverser door. The second thrust reverser door is arranged to an opposing side of the pivoting door thrust reverser system from the first thrust reverser door. The pivot axis of the first thrust reverser door is angularly offset from a reference line by an acute angle. The reference line is coincident with and perpendicular to a centerline of the pivoting door thrust reverser system.

19 Claims, 9 Drawing Sheets

THRUST REVERSER SYSTEM WITH ANGLED DOOR PIVOT AXES

BACKGROUND

1. Technical Field

This disclosure relates generally to an aircraft propulsion system and, more particularly, to a thrust reverser system for the aircraft propulsion system.

2. Background Information

An aircraft propulsion system may include a thrust reverser system such as a pivoting door thrust reverser system. Various types and configurations of pivoting door thrust reverser systems are known in the art. While these known pivoting door thrust reverser systems have various benefits, there is still room for improvement. There is a need in the art, in particular, for a pivoting door thrust reverser system with improved performance and/or tailorable efflux.

SUMMARY OF THE DISCLOSURE

According to an aspect of the present disclosure, an apparatus is provided for an aircraft propulsion system. This apparatus includes a pivoting door thrust reverser system, and the pivoting door thrust reverser system includes a plurality of thrust reverser doors. Each of the thrust reverser doors is configured to pivot about a respective pivot axis between a stowed position and a deployed position. The thrust reverser doors include a first thrust reverser door and a second thrust reverser door. The second thrust reverser door is arranged to an opposing side of the pivoting door thrust reverser system from the first thrust reverser door. The pivot axis of the first thrust reverser door is angularly offset from a reference line by an acute angle. The reference line is coincident with and perpendicular to a centerline of the pivoting door thrust reverser system.

According to another aspect of the present disclosure, another apparatus is provided for an aircraft propulsion system. This apparatus includes a pivoting door thrust reverser system, and the pivoting door thrust reverser system includes a plurality of thrust reverser doors. Each of the thrust reverser doors is configured to pivot about a respective pivot axis between a stowed position and a deployed position. The thrust reverser doors include a first thrust reverser door and a second thrust reverser door. The second thrust reverser door is arranged to an opposing side of the pivoting door thrust reverser system from the first thrust reverser door. The pivot axis of the first thrust reverser door is non-parallel with the pivot axis of the second thrust reverser door when viewed in a reference plane perpendicular to a centerline of the pivoting door thrust reverser system.

According to still another aspect of the present disclosure, another apparatus is provided for an aircraft propulsion system. This apparatus includes a fixed structure and a thrust reverser door coupled to the fixed structure by a hinge with a hinge line. The fixed structure extends circumferentially about and axially along a centerline. The thrust reverser door is configured to pivot about the hinge line between a stowed position and a deployed position where the hinge line is angularly offset from a waterline of the aircraft propulsion system by an acute angle. The thrust reverser door extends circumferentially about the centerline more than ninety degrees.

The reference plane may be defined by a waterline and a butt line of the aircraft propulsion system.

The pivot axis of the first thrust reverser door may be angularly offset from the waterline. In addition or alternatively, the pivot axis of the second thrust reverser door may be angularly offset from the waterline.

The pivot axis of the first thrust reverser door may be perpendicular to the centerline. In addition or alternatively, the pivot axis of the second thrust reverser door may be perpendicular to the centerline.

The pivot axis of the first thrust reverser door may be offset from the pivot axis of the second thrust reverser door along the centerline.

The reference line may be a butt line of the aircraft propulsion system.

The acute angle may be less than ninety degrees and greater than seventy-five degrees.

The pivot axis may be perpendicular to the centerline.

The pivot axis may be angularly offset from the centerline by a second acute angle.

The pivot axis of the second thrust reverser door may be angularly offset from the reference line by a second acute angle.

The pivot axis of the first thrust reverser door may be non-parallel with the pivot axis of the second thrust reverser door.

The pivot axis of the first thrust reverser door and the pivot axis of the second thrust reverser door may be aligned along the centerline.

The pivot axis of the first thrust reverser door and the pivot axis of the second thrust reverser door may be offset along the centerline.

The thrust reverser doors may be configured to nest with one another when each of the thrust reverser doors is in the deployed position.

The apparatus may also include a fixed structure. Each of the thrust reverser doors may be pivotally attached to the fixed structure by a respective hinge that comprises the respective pivot axis.

The pivoting door thrust reverser system may be configured as a pre-exit pivoting door thrust reverser system.

The pivoting door thrust reverser system may be configured as a post-exit pivoting door thrust reverser system.

Each of the thrust reverser doors may extend circumferentially about the centerline between ninety degrees and one-hundred and eighty degrees.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
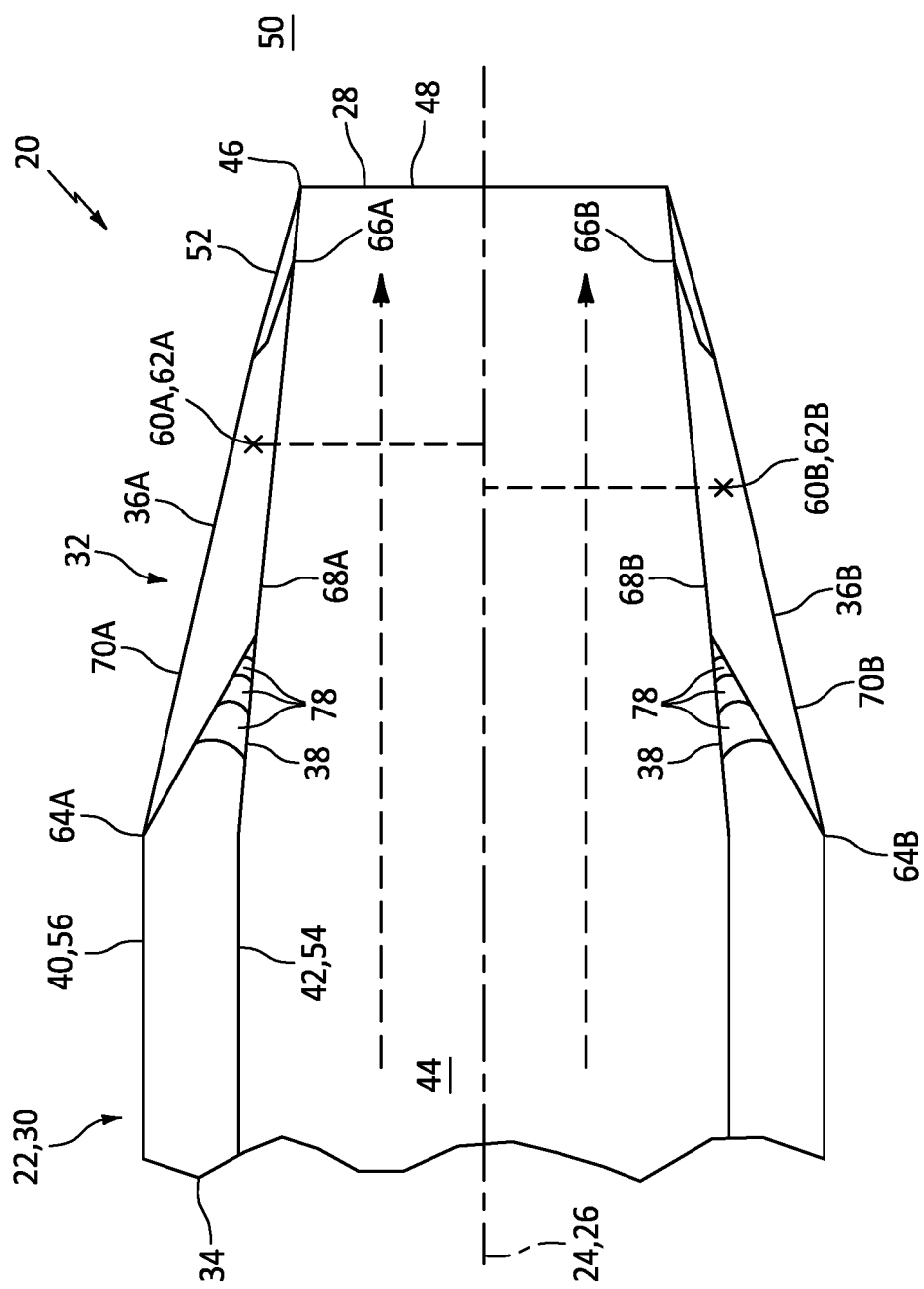
FIGS. 1 and 2 are side sectional schematic illustrations of an aft section of a propulsion system with a thrust reverser system in various arrangements.
Figure 2:
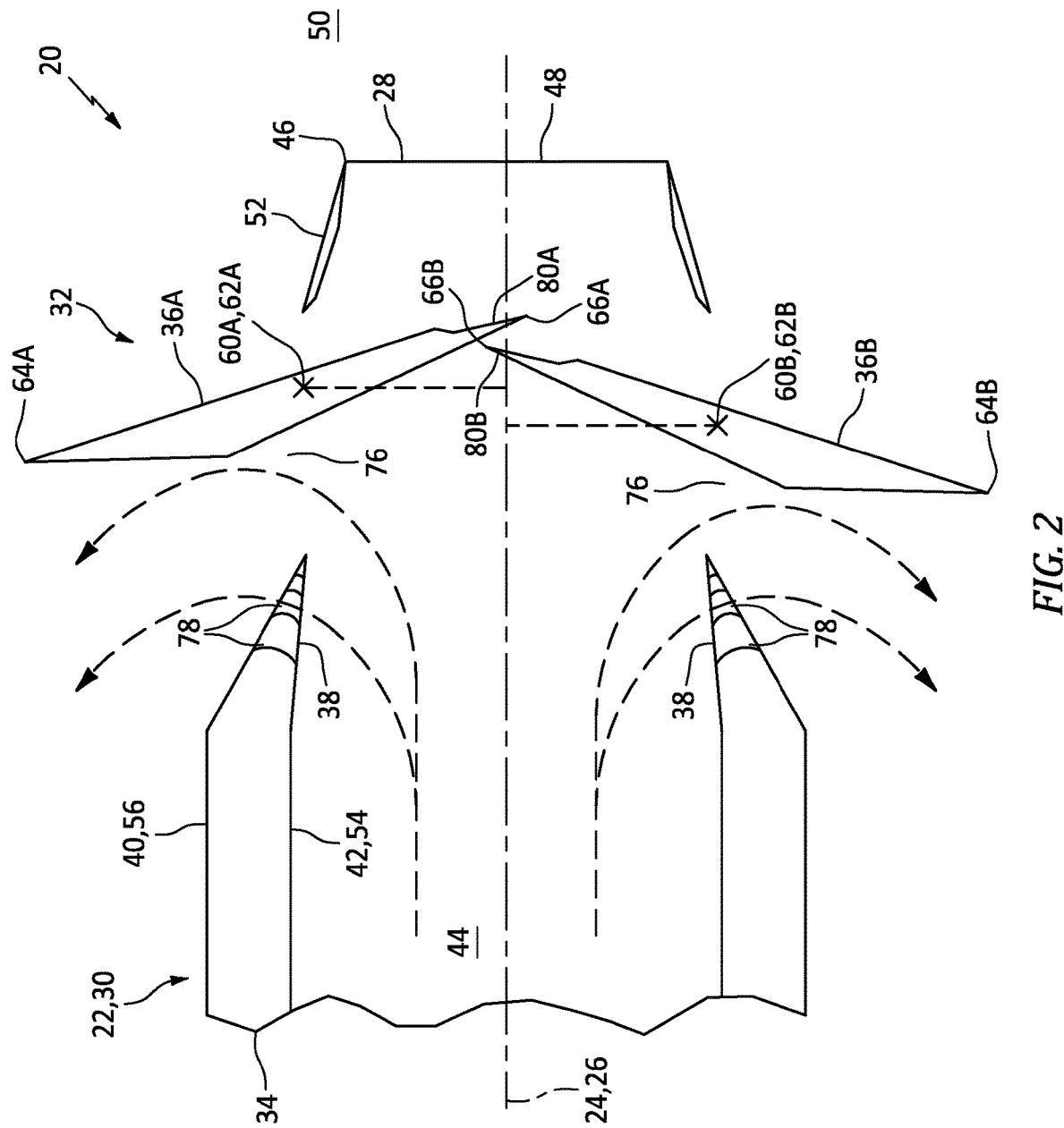

FIGS. 1 and 2 illustrate an aft section of a propulsion system 20 for an aircraft such as, but not limited to, a commercial airliner or cargo plane. This aircraft propulsion system 20 includes a nacelle 22 and a gas turbine engine (not visible in FIGS. 1 and 2). The gas turbine engine may be configured as a turbojet gas turbine engine or a turbofan gas turbine engine; however, the present disclosure is not limited to such exemplary engine configurations.

The nacelle 22 is configured to house and provide an aerodynamic cover for the gas turbine engine. The nacelle 22 extends axially along an axial centerline 24 (e.g., a station line 26) of the aircraft propulsion system 20 to a downstream, aft end 28 of the nacelle 22. The nacelle 22 of FIGS. 1 and 2 includes a nacelle aft structure 30 (a structure of the aircraft propulsion system 20) configured with a thrust reverser system 32. This thrust reverser system 32 is configured as a pivoting door thrust reverser system. More particularly, the thrust reverser system 32 may be configured as a target-type thrust reverser system. The term "target-type" may describe a pivoting door thrust reverser system that redirects a hot gas stream (e.g., a core gas stream) exhausted from the gas turbine engine, or both an outer cold gas stream (e.g., a bypass gas stream) and an inner hot gas stream (e.g., a core gas stream) exhausted from the gas turbine engine. It is contemplated, however, the thrust reverser system 32 may alternatively be configured as a clamshell-type thrust reverser system. The term "clamshell-type" may describe a pivoting door thrust reverser system that redirects an outer cold gas stream exhausted from the gas turbine engine, but not an inner hot gas stream exhausted from the gas turbine engine.

The aft structure 30 of FIGS. 1 and 2 includes a fixed structure 34 and one or more (e.g., an opposing pair of) thrust reverser doors 36A and 36B (generally referred to as "36"). The aft structure 30 may also include (or may be configured without) one or more cascade structures 38.

Figure 3:
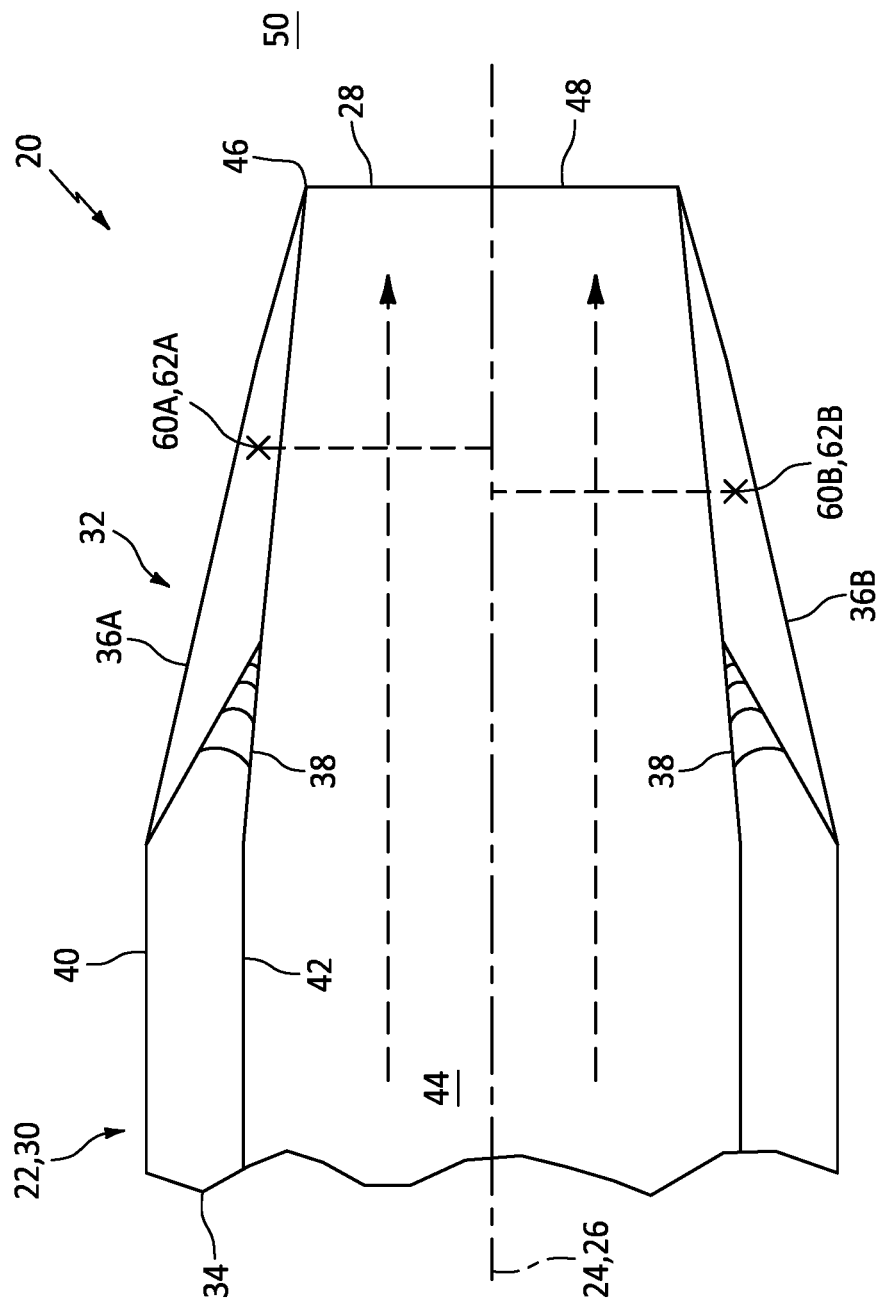
FIGS. 3 and 4 are side sectional schematic illustrations of the aft section of the propulsion system with another thrust reverser system in various arrangements.
Figure 4:
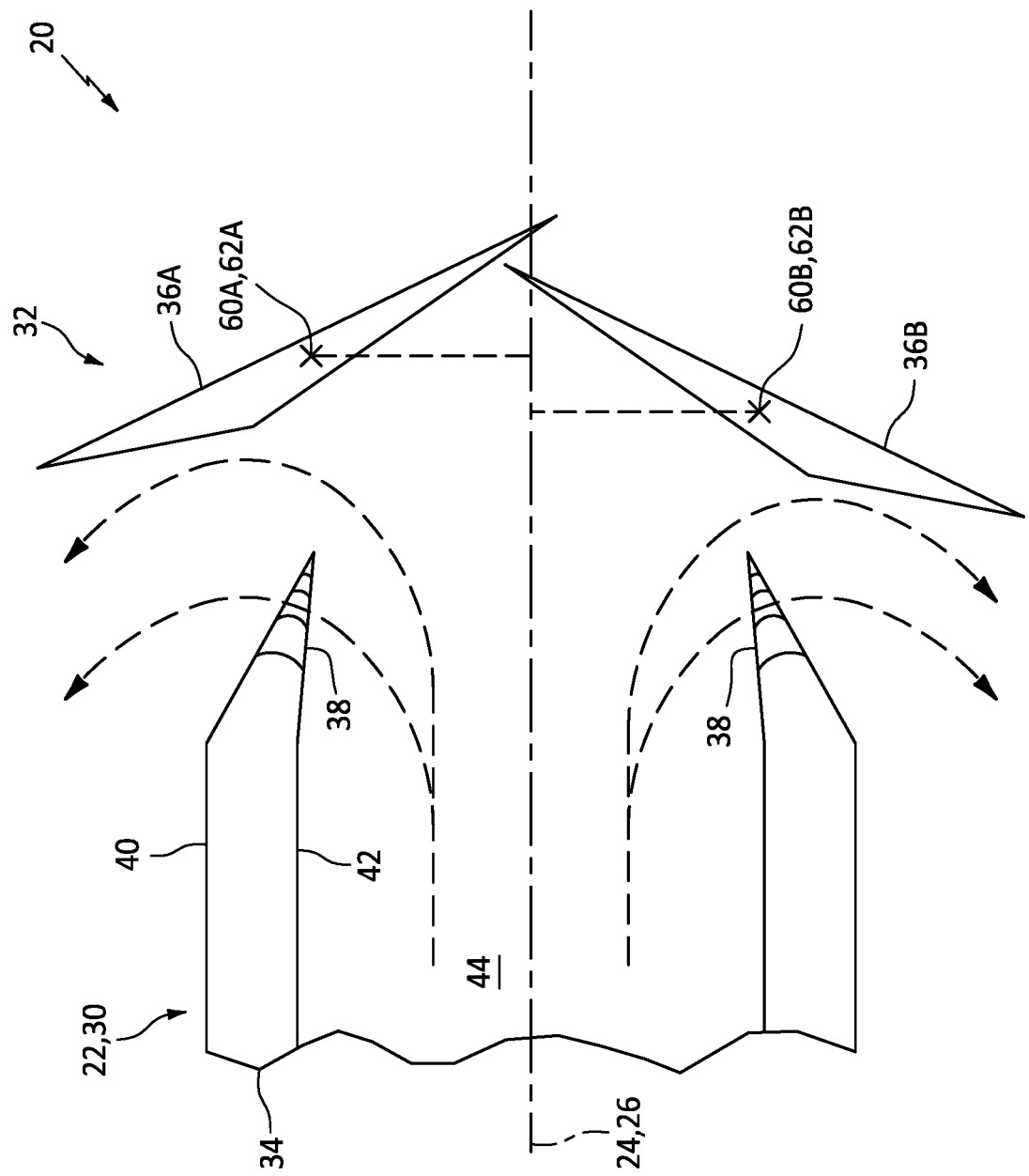

Referring to FIG. 1, the aft structure 30 and its components (e.g., 34 and 36) are configured to form an aft portion of an outer aerodynamic flow surface 40 of the nacelle 22. The aft structure 30 and its components (e.g., 34 and 36) are configured to form an aft portion of an inner aerodynamic flow surface 42 of the nacelle 22. This aft portion of the inner aerodynamic flow surface 42 forms an outer peripheral boundary of an aft-most portion of a flowpath 44 within the aircraft propulsion system 20. This aft-most portion of the flowpath 44 receives a gas flow (e.g., core gas and/or bypass air) from the upstream gas turbine engine. The aft-most portion of the flowpath 44 extends axially along the axial centerline 24 within the aircraft propulsion system 20 and its aft structure 30 to an annular trailing edge 46 of an exhaust nozzle 48, at which point the flowpath 44 of FIG. 1 meets an exterior environment 50 surrounding the aircraft propulsion system 20. This exhaust nozzle 48 may be at least partially or completely formed by an aft portion 52 of the fixed structure 34 (or another standalone nozzle structure). With such an arrangement, the thrust reverser system 32 may be termed a "pre-exit" thrust reverser system. Alternatively, referring to FIGS. 3 and 4, the exhaust nozzle 48 may be at least partially or completely formed by the thrust reverser doors 36. With such an arrangement, the thrust reverser system 32 may be termed a "post-exit" thrust reverser system. While the disclosure herein may be applicable to both pre-exit and post-exit thrust reverser systems, the thrust reverser system 32 is described below with respect to the pre-exit thrust reverser system (e.g., a pre-exit pivoting door thrust reverser system) for ease of description.

The fixed structure 34 of FIG. 1 extends axially along the axial centerline 24 to a downstream, aft end of the fixed structure 34. The fixed structure 34 extends radially between and to a radial inner side 54 of the fixed structure 34 and a radial outer side 56 of the fixed structure 34. The structure inner side 54 may partially form the inner aerodynamic flow surface 42. The structure outer side 56 may partially form the outer aerodynamic flow surface 40. The fixed structure 34 extends circumferentially about (e.g., completely around) the axial centerline 24, thereby providing the fixed structure 34 with, for example, a tubular body.

Figure 5:
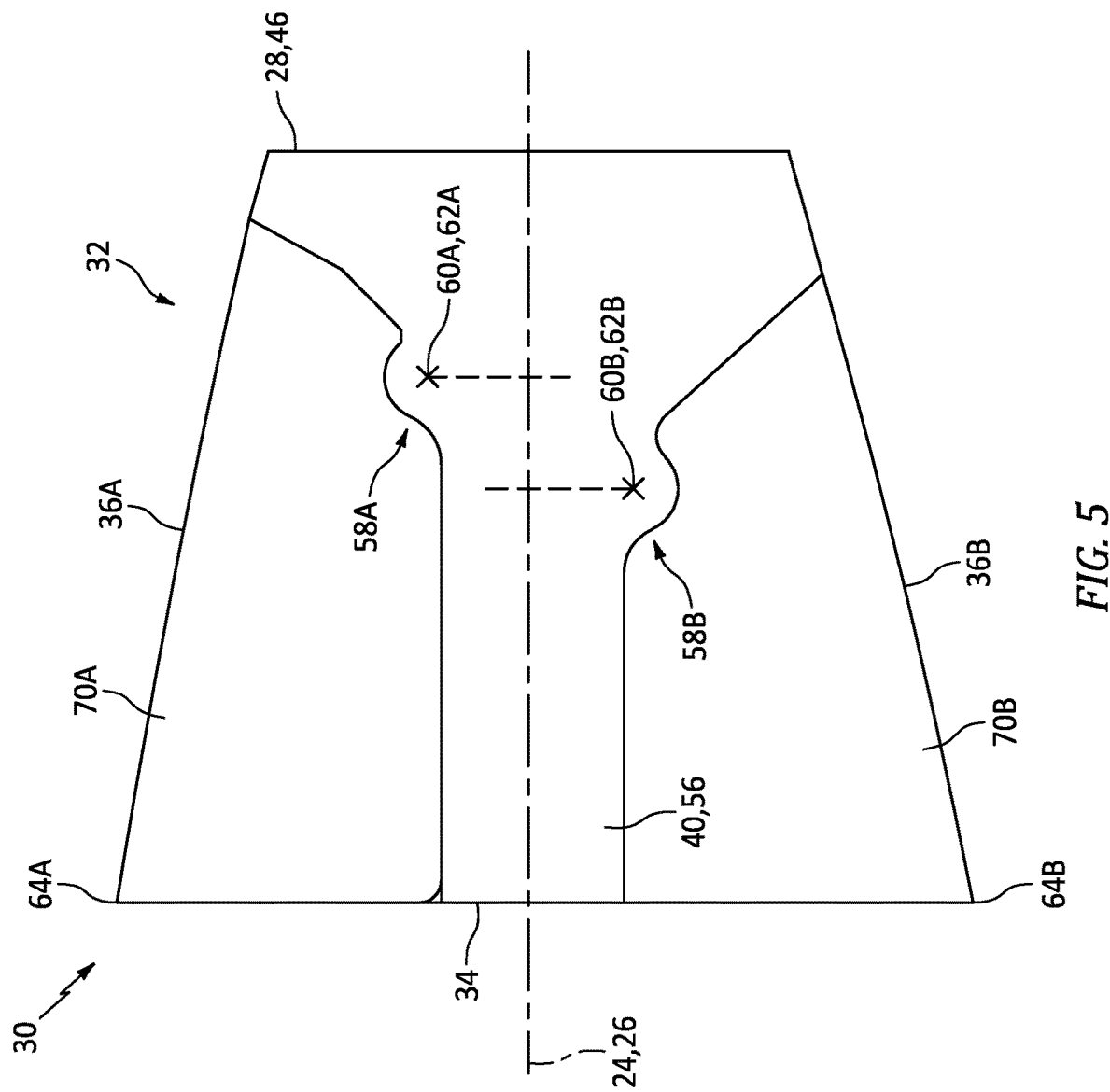
FIG. 5 is a side illustration of the thrust reverser system in a stowed arrangement.
Figure 6:
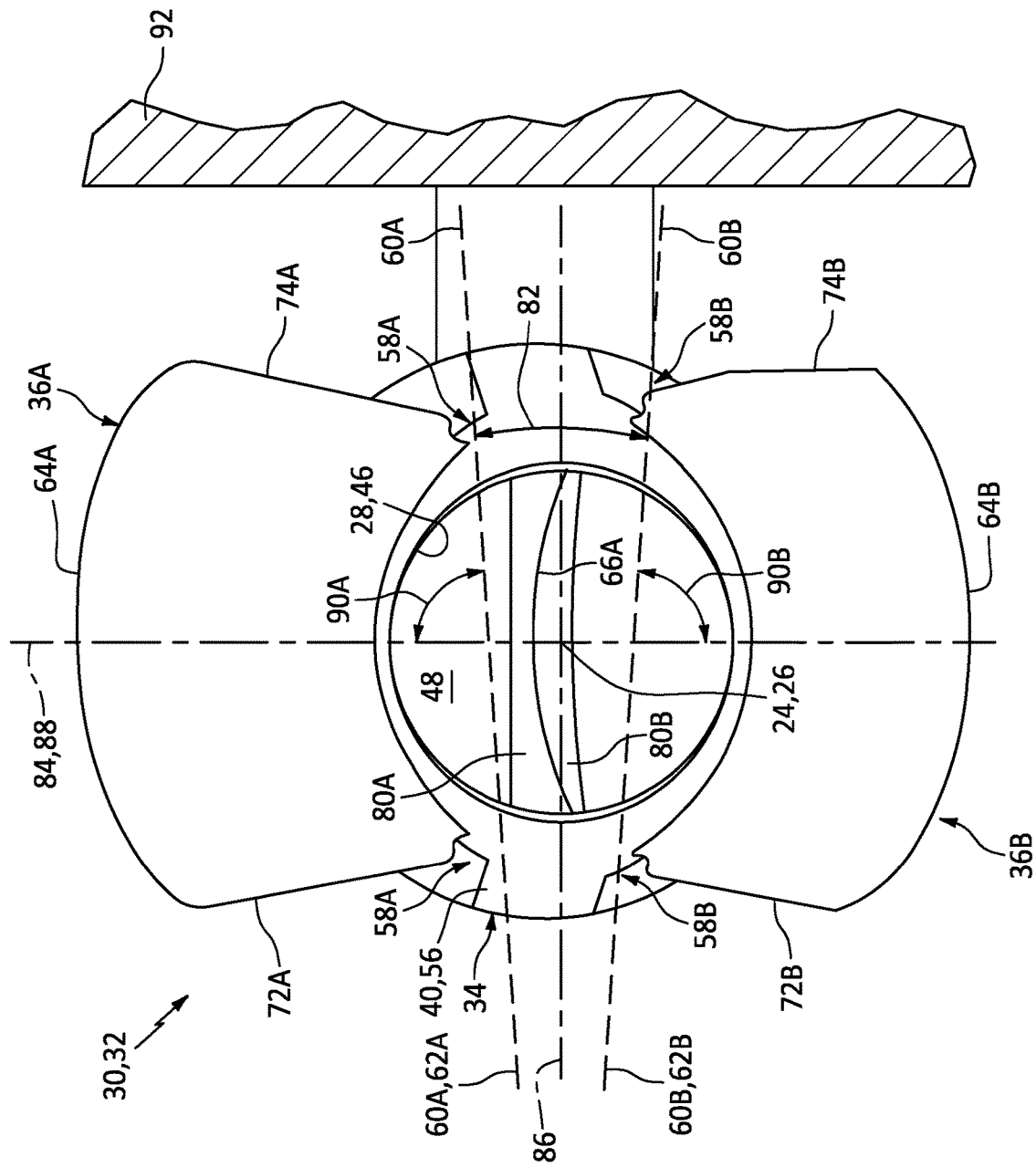
FIG. 6 is an end view illustration of the thrust reverser system mounted to an aircraft airframe component with the thrust reverser system in a deployed arrangement.

The thrust reverser doors 36 are arranged circumferentially about the axial centerline 24. More particularly, the thrust reverser doors 36 of FIGS. 1 and 2 are arranged on (e.g., diametrically) opposing sides of the thrust reverser system 32 and the flowpath 44. Referring to FIGS. 5 and 6, the thrust reverser doors 36 may be moveably attached to the fixed structure 34. Each thrust reverser door 36A, 36B, for example, may be pivotally attached to the fixed structure 34 by one or more hinges 58A, 58B (generally referred to as "58"). Each hinge 58A, 58B has a hinge line 60A, 60B (generally referred to as "60"). The hinge line(s) 60A, 60B of the hinge(s) 58A, 58B for a respective one of the thrust reverser doors 36A, 36B form a pivot axis 62A, 62B (generally referred to as "62") for that thrust reverser door 36A, 36B. Each thrust reverser door 36 may pivot about its respective pivot axis 62 between a stowed, closed position (e.g., see FIGS. 1 and 5) and a deployed, open position (e.g., see FIGS. 2 and 6).

Each thrust reverser door 36 may be pivoted between its stowed position and its deployed position by one or more dedicated actuators; e.g., linear actuators such as hydraulic cylinders, leadscrews, etc. Alternatively, the thrust reverser system 32 may include one or more common actuators to pivot the thrust reverser doors 36 between their stored positions and their deployed positions.

Each thrust reverser door 36A, 36B may have an arcuate (e.g., partially conical) body. For example, when in the stowed position of FIG. 1 (see also FIG. 5), each of the thrust reverser doors 36A, 36B extends axially along the axial centerline 24 between a forward end 64A, 64B (generally referred to as "64") (e.g., leading edge) of the respective thrust reverser door 36A, 36B and an aft end 66A, 66B (generally referred to as "66") (e.g., trailing edge) of the respective thrust reverser door 36A, 36B. Each of the thrust reverser doors 36A, 36B extends radially between and to a radial inner side 68A, 68B (generally referred to as "68") of the respective thrust reverser door 36A, 36B and a radial outer side 70A, 70B (generally referred to as "70") of the respective thrust reverser door 36A, 36B. The door inner side 68A, 68B may partially form the inner aerodynamic flow surface 42. The door outer side 70A, 70B may partially form the outer aerodynamic flow surface 40. Referring to FIG. 6, each of the thrust reverser doors 36A, 36B extends circumferentially about (e.g., partially around) the axial centerline 24 a certain door angle between circumferentially opposing sides 72A, 72B (generally referred to as "72") and 74A, 74B (generally referred to as "74") of the respective thrust reverser door 36A, 36B.

In some embodiments, the door angle may be equal to or greater than ninety degrees (90°); e.g., between one-hundred and thirty-five degrees (135°) and one-hundred and eighty degrees (180°). In addition or alternatively, an axial length of each thrust reverser door 36 (between the door ends 64 and 66; see FIG. 1) may be equal to, or within plus/minus (+/−) ten percent (10%), twenty percent (20%), thirty percent (30%) of, a circumferential width of that thrust reverser door 36 (between the door sides 72 and 74; see FIG. 6). With such an arrangement, the thrust reverser system 32 may be configured with (e.g., only) two of the thrust reverser doors 36, where one of the thrust reverser doors (e.g., 36A; a top door or alternatively a first side door) is disposed on and extends along one side of the aircraft propulsion system 20/the flowpath 44, and where the other one of the thrust reverser doors (e.g., 36B; a bottom door or alternatively a second side door) is disposed on and extends along the other side of the aircraft propulsion system 20/the flowpath 44. The present disclosure, however, is not limited to such exemplary dimensions or door arrangements.

When stowed, each of the stowed thrust reverser doors 36 of FIG. 1 (see also FIG. 2) may axially overlap/cover one or more thrust reverser passages 76 and 78; e.g., a jet pipe opening 76 (see FIG. 2), cascade port(s) 78, etc. By covering these thrust reverser passages 76 and 78, the thrust reverser door 36 may generally prevent gas from flowing radially outward through the thrust reverser passages 76 and 78 from the flowpath 44. The gas exhausted from the gas turbine engine may thereby flow (e.g., unobstructed) through the flowpath 44 and out of the aircraft propulsion system 20 through the exhaust nozzle 48. By contrast, when deployed to the deployed position of FIG. 2 (see also FIG. 6), each thrust reverser door 36 pivots outward into the exterior environment 50 outside of the aircraft propulsion system 20 and downward into the flowpath 44. This thrust reverser door movement uncovers outer sides of the thrust reverser passages 76 and 78 and may thereby open the thrust reverser passages 76 and 78, where each jet pipe opening 76 of FIG. 2 is formed by and/or extends axially between a respective one of the cascade structures 38 and a respective one of the thrust reverser doors 36. The thrust reverser door movement also positions the thrust reverser doors 36 to block access to the exhaust nozzle 48 as well as redirect the gas flowing within the flowpath 44 radially outward and through the thrust reverser passages 76 and 78.

Referring to FIGS. 2 and 6, to increase (e.g., improve) blocking downstream access to the exhaust nozzle 48 and/or redirecting of gas from the flowpath 44 through the thrust reverser passages 76 and 78 during thrust reverser system operation, portions 80A and 80B (generally referred to as "80") of the thrust reverser doors 36A and 36B at the aft ends 66A and 66B may be partially nested. The aft end portions 80 of the thrust reverser doors 36 may also or alternatively radially overlap one another. With this arrangement, the thrust reverser doors 36 may substantially or completely block a straight line-of-sight into an upstream portion of the flowpath 44 from the exhaust nozzle 48. To facilitate this nesting and/or radial overlap, the pivot axis 62A for the first thrust reverser door 36A of FIG. 6 is arranged non-parallel with the pivot axis 62B for the second thrust reverser door 36B. More particularly, the pivot axis 62A for the first thrust reverser door 36A is angularly offset from the pivot axis 62B for the second thrust reverser door 36B by an acute angle 82 when viewed in a reference plane, for example, perpendicular to the axial centerline 24; e.g., a plane defined by a butt line 84 of the aircraft propulsion system 20 and a waterline 86 of the aircraft propulsion system 20. The inter-pivot axis angle 82 may be greater than zero degrees (0°) and less than thirty degrees (30°); e.g., between one degree (10) and five degrees (5°), between five degrees (5°) and ten degrees (10°), etc.

Referring to FIG. 6, the pivot axis 62A for the first thrust reverser door 36A may be angled relative to a reference line 88 (e.g., the butt line 84) which is coincident with and perpendicular to the axial centerline 24 (e.g., the station line 26). The pivot axis 62A for the first thrust reverser door 36A, for example, may be angularly offset from the reference line 88 by an acute angle 90A. This first inter-pivot axis-reference line angle 90A may be less than ninety degrees (90°) and greater than seventy-five degrees (75°); e.g., between seventy-five degrees (75°) and eighty degrees (80°), between eighty degrees (80°) and eighty-five degrees (85°), between eighty-five degrees (85°) and ninety degrees (90°). However, in other embodiments, the pivot axis 62A for the first thrust reverser door 36A may alternatively be perpendicular to the reference line 88 or parallel with the reference line 88 (depending upon how the aircraft propulsion system 20 is arranged with/mounted to an airframe of the aircraft).

The pivot axis 62B for the second thrust reverser door 36B may be angled relative to the reference line 88. The pivot axis 62B for the second thrust reverser door 36B, for example, may be angularly offset from the reference line 88 by an acute angle 90B. This second inter-pivot axis-reference line angle 90B may be less than ninety degrees (90°) and greater than seventy-five degrees (75°); e.g., between seventy-five degrees (75°) and eighty degrees (80°), between eighty degrees (80°) and eighty-five degrees (85°), between eighty-five degrees (85°) and ninety degrees (90°). However, in other embodiments, the pivot axis 62B for the first thrust reverser door 36A may alternatively be perpendicular to the reference line 88 or parallel with the reference line 88 (depending upon how the aircraft propulsion system 20 is arranged with/mounted to the aircraft airframe). A magnitude of the second inter-pivot axis-reference line angle 90B may be equal to or different (e.g., greater or less) than the first inter-pivot axis-reference line angle 90A.

The aircraft propulsion system 20 and its thrust reverser system 32 may be located near (e.g., next to) a component 92 of the aircraft airframe such as, but not limited to, a fuselage or a wing. With such an arrangement, the pivot axes 62 may be angled such that the thrust reverser doors 36 tip/tilt away from the airframe component 92. The thrust reverser doors 36 may thereby direct an efflux of the gas out of the flowpath 44 and away from the airframe component 92.

Figure 7:
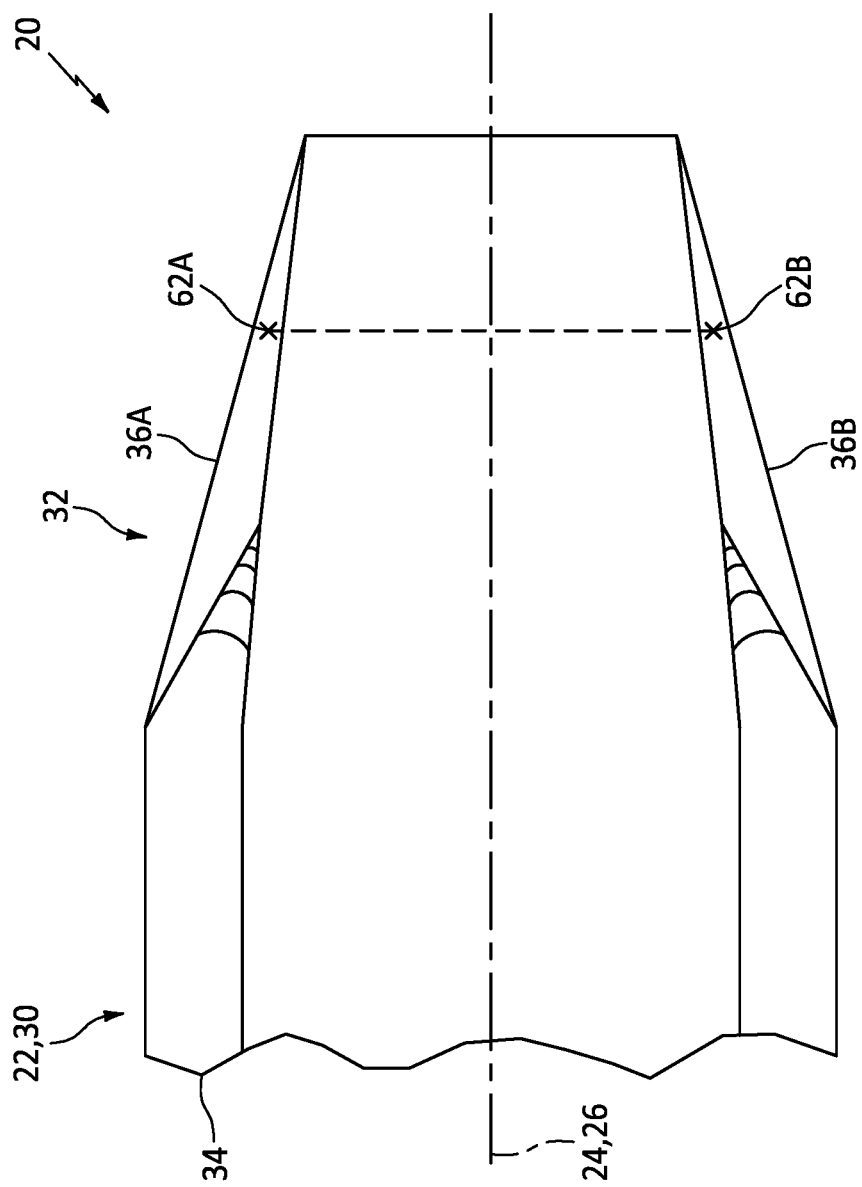
FIG. 7 is a side sectional schematic illustration of the aft section of the propulsion system with another thrust reverser system in a stowed arrangement.

In some embodiments, referring to FIGS. 1 and 2, the pivot axes 62 may be axially offset from one another along the axial centerline 24. The pivot axes 62, more particularly, may be arranged at different locations along the station line 26. In other embodiments, referring to FIG. 7, the pivot axes 62 may be axially aligned along the axial centerline 24. The pivot axes 62, more particularly, may be arranged at a common location along the station line 26.

Figure 9:
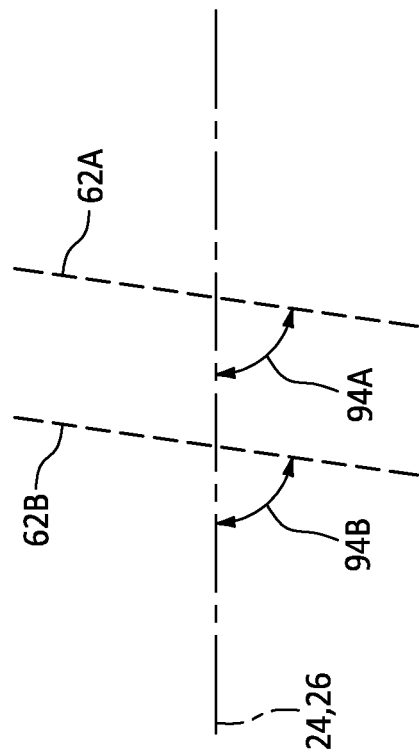
FIG. 9 is a schematic illustration of the thrust reverser door pivot axes angularly offset from the centerline of the propulsion system.
Figure 8:
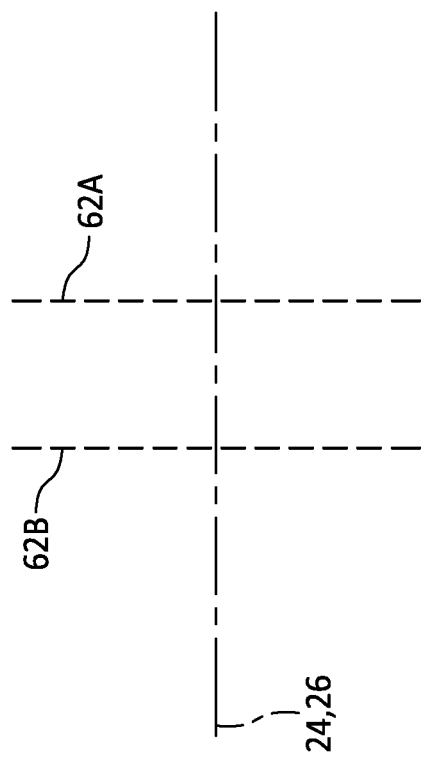
FIG. 8 is a schematic illustration of thrust reverser door pivot axes perpendicular to a centerline of the propulsion system.

In some embodiments, referring to FIG. 8, the pivot axis 62A for the first thrust reverser door and/or the pivot axis 62B for the second thrust reverser door may each be arranged perpendicular to the axial centerline 24. In other embodiments, referring to FIG. 9, the pivot axis 62A for the first thrust reverser door and/or the pivot axis 62B for the second thrust reverser door may each angularly offset from the axial centerline 24 by a respective acute angle 94A, 94B (generally referred to as "94"). This inter-pivot axis-axial centerline angle 94 may be less than ninety degrees (90°) and greater than seventy-five degrees (75°); e.g., between seventy-five degrees (75°) and eighty degrees (80°), between eighty degrees (80°) and eighty-five degrees (85°), between eighty-five degrees (85°) and ninety degrees (90°).

Figure 10:
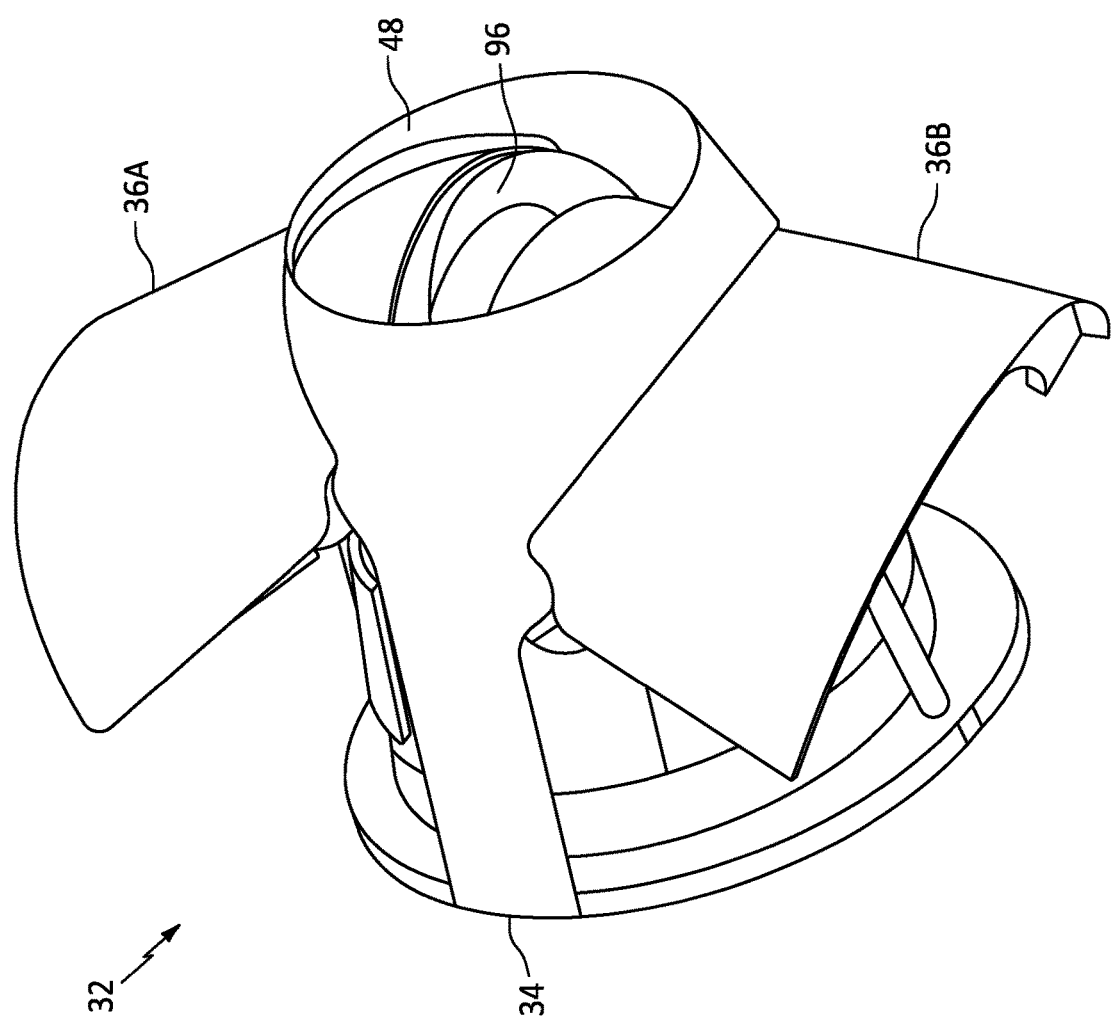
FIG. 10 is a perspective illustration of the thrust reverser system in a deployed arrangement.

In some embodiments, the thrust reverser doors 36 may pivot a common number of degrees about their pivot axes 62 between the stowed and the deployed positions. In other embodiments, however, one of the thrust reverser doors 36 may pivot a larger number of degrees about its pivot axis 62 between the stowed and the deployed positions than the other one of the thrust reverser doors 36. By opening one of the thrust reverser doors 36 more than the other one of the thrust reverser doors 36, it may be possible to mitigate vectored leakage through a gap between the deployed (e.g., opened) thrust reverser doors 36; e.g., see gap 96 in FIG. 10.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An apparatus for an aircraft propulsion system, comprising:
    a pivoting door thrust reverser system including a plurality of thrust reverser doors;
    each of the plurality of thrust reverser doors configured to pivot about a respective pivot axis between a stowed position and a deployed position;
    the plurality of thrust reverser doors including a first thrust reverser door and a second thrust reverser door, the second thrust reverser door arranged to an opposing side of the pivoting door thrust reverser system from the first thrust reverser door; and
    the pivot axis of the first thrust reverser door angularly offset from a reference line by an acute angle, the pivot axis of the second thrust reverser door angularly offset from the reference line by a second acute angle, and the reference line coincident with and perpendicular to a centerline of the pivoting door thrust reverser system, wherein the reference line is a butt line of the aircraft propulsion system;
    wherein the first thrust reverser door extends circumferentially a first door angle around the centerline between circumferentially opposing sides of the first thrust reverser door, the second thrust reverser door extends circumferentially a second door angle around the centerline between circumferentially opposing sides of the second thrust reverser door, and the first door angle and the second door angle are each equal to or greater than one-hundred and thirty-five degrees; and
    wherein the pivot axis of the first thrust reverser door is non-parallel with the pivot axis of the second thrust reverser door when viewed in a reference plane perpendicular to the centerline of the pivoting door thrust reverser system.

2. The apparatus of claim 1, wherein the acute angle is less than ninety degrees and greater than seventy-five degrees.

3. The apparatus of claim 1, wherein the pivot axis of the first thrust reverser door is perpendicular to the centerline.

4. The apparatus of claim 1, wherein the pivot axis of the first thrust reverser door is angularly offset from the centerline by a third acute angle.

5. The apparatus of claim 1, wherein the pivot axis of the first thrust reverser door is non-parallel with the pivot axis of the second thrust reverser door.

6. The apparatus of claim 1, wherein the pivot axis of the first thrust reverser door and the pivot axis of the second thrust reverser door are aligned along the centerline.

7. The apparatus of claim 1, wherein the pivot axis of the first thrust reverser door and the pivot axis of the second thrust reverser door are offset along the centerline.

8. The apparatus of claim 1, wherein the plurality of thrust reverser doors are configured to nest with one another when each of the plurality of thrust reverser doors is in the deployed position.

9. The apparatus of claim 1, further comprising:
    a fixed structure;
    each of the plurality of thrust reverser doors pivotally attached to the fixed structure by a respective hinge that comprises the respective pivot axis.

10. The apparatus of claim 1, wherein the pivoting door thrust reverser system is configured as a pre-exit pivoting door thrust reverser system.

11. The apparatus of claim 1, wherein the pivoting door thrust reverser system is configured as a post-exit pivoting door thrust reverser system.

12. The apparatus of claim 1, wherein the second acute angle is equal to the acute angle.

13. An apparatus for an aircraft propulsion system, comprising:
    a pivoting door thrust reverser system including a plurality of thrust reverser doors;
    each of the plurality of thrust reverser doors configured to pivot about a respective pivot axis between a stowed position and a deployed position;
    the plurality of thrust reverser doors including a top thrust reverser door and a bottom thrust reverser door, the bottom thrust reverser door arranged below and to an opposing side of the pivoting door thrust reverser system from the top thrust reverser door; and
    the pivot axis of the top thrust reverser door non-parallel with the pivot axis of the bottom thrust reverser door when viewed in a reference plane perpendicular to a centerline of the pivoting door thrust reverser system, wherein the pivot axis of the top thrust reverser door is angularly offset from a butt line of the aircraft propulsion system by an acute angle;
    wherein a first of the plurality of thrust reverser doors extends circumferentially a first door angle around the centerline between circumferentially opposing sides of the first of the plurality of thrust reverser doors, the first of the plurality of thrust reverser doors comprises the top thrust reverser door or the bottom thrust reverser door, and the first door angle is between one-hundred and thirty-five degrees and one-hundred and eighty degrees.

14. The apparatus of claim 13, wherein the reference plane is defined by a waterline of the aircraft propulsion system and the butt line of the aircraft propulsion system.

15. The apparatus of claim 14, wherein at least one of
    the pivot axis of the top thrust reverser door is angularly offset from the waterline; or the pivot axis of the bottom thrust reverser door is angularly offset from the waterline.

16. The apparatus of claim 13, wherein at least one of
the pivot axis of the top thrust reverser door is perpendicular to the centerline; or
the pivot axis of the bottom thrust reverser door is perpendicular to the centerline.

17. The apparatus of claim 13, wherein the pivot axis of the top thrust reverser door is offset from the pivot axis of the bottom thrust reverser door along the centerline.

18. An assembly for an aircraft, comprising:
an aircraft fuselage; and
an aircraft propulsion system next to a side of the aircraft fuselage and mounted to the aircraft fuselage, the aircraft propulsion system comprising a pivoting door thrust reverser system;
the pivoting door thrust reverser system including a plurality of thrust reverser doors, each of the plurality of thrust reverser doors configured to pivot about a respective pivot axis between a stowed position and a deployed position, the plurality of thrust reverser doors including a first thrust reverser door and a second thrust reverser door, the second thrust reverser door arranged to an opposing side of the pivoting door thrust reverser system from the first thrust reverser door, the pivot axis of the first thrust reverser door angularly offset from a reference line by a first acute angle, and the pivot axis of the second thrust reverser door angularly offset from the reference line by a second acute angle, wherein the first acute angle and the second acute angle are selected such that the plurality of thrust reverser doors tilt away from the aircraft fuselage when pivoted from the stowed position to the deployed position;
wherein the first thrust reverser door extends circumferentially a first door angle around a centerline of the pivoting door thrust reverser system between circumferentially opposing sides of the first thrust reverser door, and the first door angle is between one-hundred and thirty-five degrees and one-hundred and eighty degrees.

19. The assembly of claim 18, wherein the reference line is a butt line of the aircraft propulsion system.

* * * * *